United States Patent [19]

Orso et al.

[11] 4,083,728

[45] Apr. 11, 1978

[54] METHOD FOR MAKING GLASS

[75] Inventors: Francis L. Orso, Corning; Timothy E. Pierce, Pine City, both of N.Y.

[73] Assignee: Corning Glass Works, Corning, N.Y.

[21] Appl. No.: 228,298

[22] Filed: Feb. 22, 1972

Related U.S. Application Data

[63] Continuation of Ser. No. 45,905, Jun. 12, 1970, abandoned.

[51] Int. Cl.² ................................................. C03C 3/04
[52] U.S. Cl. ........................................ 106/52; 264/63
[58] Field of Search ................ 264/42, 63; 106/38.35, 106/40 V, 41, 52, 54, 69, 74

[56] References Cited

U.S. PATENT DOCUMENTS

| | | | |
|---|---|---|---|
| 2,908,952 | 10/1959 | Benham | 106/38.35 X |
| 3,028,340 | 4/1962 | Gandon | 106/38.35 X |
| 3,525,631 | 8/1970 | Brown | 264/63 X |
| 3,615,780 | 10/1971 | Kim | 106/74 |

*Primary Examiner*—Thomas P. Pavelko
*Attorney, Agent, or Firm*—Clinton S. Janes, Jr.; Clarence R. Patty, Jr.

[57] ABSTRACT

This invention relates to a low temperature method for making and forming silicate glass bodies from reaction mixtures of soluble silicates and/or colloidal silicates and organic compounds wherein the formed reacted body is fired at elevated temperatures below the deformation point of the particular glass composition for a sufficient length of time to convert it to a glass body having a structural configuration similar to that of the formed body.

9 Claims, No Drawings

METHOD FOR MAKING GLASS

BACKGROUND OF THE INVENTION

This is a continuation of application Ser. No. 45,905, filed June 12, 1970, and now abandoned.

Soluble silicate solutions, e.g., alkali metal silicates and quaternary ammonium silicate, are well known to the art. Copending U.S. patent application, Ser. No. 45,806, filed of even date with Ser. No. 45,905 in the names of J. E. Pierson and S. D. Stookey discloses unique products made therefrom and the particular process required for their preparation. The process requires the preparation of true solutions, colloidal solutions, or suspensions of soluble silicates with certain defined organic compounds. These solutions and/or suspensions must contain concentrations of silica greater than about 1 mole per liter in solution. Although it may be desirable to have as much silica as possible in the solution, as a practical matter it is difficult to obtain concentrations greater than about 12 moles per liter. It will be understood, of course, that the suspensions employed may also have a high concentration of silica suspended in the water medium. Since silica itself is insouble, the silica is added in the form of a soluble silicate which is normally an inorganic alkali metal silicate or an organic ammonium silicate, preferably, a quaternary ammonium silicate. The ratio of the alkali metal oxide or quaternary ammonium ion to silica can vary, but the amount of silica in solution must be at least 1 mole per liter. Experience has demonstrated that a silica concentration of at least 3 moles per liter in solution is much to be preferred to secure an article of substantial strength. Also, higher silica concentrations in solution insure more rapid reactions and make easier the production of a solid body rather than a slush-like material. In any event, the concentration of alkali metal oxide and/or ammonium ion in the solution must be sufficient to produce a pH greater than about 10 with the preferred range varying between about 10–15.

To the soluble silicate solutions and/or suspensions are added organic compounds selected from the group consisting of formaldehyde, paraformaldehyde, formamide, glyoxal, and mixtures thereof, which will uniformly dissolve in the solution and react very slowly and uniformly throughout the solution to reduce the pH of the solution from greater than 10 to the range of about 7–9 and, in so doing, polymerize the silica. The desired concentration of the organic present in the solution is related to the alkali oxide and/or ammonium ion present. If the organic concentration is very high, undesirable instantaneous gelation of the solution can occur; or, on the other hand, if the concentration thereof is too low the desired products cannot be produced. When the ratio of the organic to the alkali oxide and/or ammonium ion falls within certain limits, a material which is leachable in cold water to a porous silica material can be produced.

The solutions and/or suspensions of soluble silicate and organic compound are reacted by treating them at moderately low temperatures, viz, between the freezing point and boiling point of the particular solution, for a sufficient length of time to cause the reaction to occur. It will be appreciated, of course, that higher temperatures are operable at elevated pressures. The reaction which occurs can be viewed as a phase separation; that is, the organic material reacts with the alkali oxide and/or ammonium ion so as to produce a less basic solution wherein the silica may then polymerize to form the desired product. After the reaction has taken place, the products described above are washed in water, acids, or other suitable solvents and then may be utilized for various purposes. In the case of the waterleachable solid, the material is washed in water so as to leach out the water soluble phases and thereby leave a coherent, opencelled, porous silica material. The network which remains after leaching is essentially pure silica. It is believed that with the lower organic ratios where is not an adequate amount of the organic present to allow the reaction to proceed sufficiently to obtain the formation of a silica network.

SUMMARY OF THE INVENTION

Quite surprisingly, we have discovered that if the reacted, but unleached, body produced by the above-described method is fired at elevated temperatures, the reacted body can be converted to a true silicate glass body. We have found that the volume of the glass body is significantly less than the volume of the reacted body and we believe the volume of the glass body is proportional to the concentration of non-volatile solids in the starting solution. Remarkably and usefully, however, the geometry of the final body is essentially identical to that of the original formed shape. The firing temperature to produce the glass body is usually below the deformation shape of the particular glass composition. Therefore, we have discovered a low temperature method by which we can produce glass bodies from solutions and/or suspension of soluble alkali and ammonium silicates and a polymerization agent. By blending the various soluble silicates, different glass compositions having varying properties can be produced.

DESCRIPTION OF THE PREFERRED EMBODIMENT

The starting solutions for the production of the bodies of our invention have the same limitations as those disclosed in U.S. patent application, Ser. No. 45,806, supra. The solutions and/or suspensions must have a silica concentration of more than 1 mole per liter and a pH greater than 10. As indicated in the aforementioned application, it is frequently desirable to have as great a silica concentration as possible. However, since the silicates are soluble in different amounts, the maximum concentration available is approximately 12 moles/liter and this when using quaternary ammonium silicate. The alkali concentration is determined by the pH of the solution, the minimum pH being about 10. That pH is necessary in order to retain the silica in solution. The maximum pH is on the order of 15 since if it is greater than that the bodies may be undesirably soluble. The organic concentration is related to the amount of alkali oxide and/or ammonium ion present and should be sufficient to react with the alkali oxide and/or ammonium ion to reduce the pH to less than 10 and, preferably, on the order of a pH of 7–9, so that the silica will polymerize and form a network. In the case of formaldehyde, paraformaldehyde, and glyoxal, the mole ratio of organic-to-alkali oxide and/or ammonium ion is normally between about 2 and 13 to 1. It was found that formamide was effective in molar amounts of as little as ⅓ that of the other three gelation agents. Hence, effective mole ratios of formamide-to-alkali metal oxide and/or ammonium ion range about 0.67–13. As indicated in the copending patent application, true solutions of sodium silicate, potassium silicate, quaternary ammonium silicate or mixtures thereof with the organic compound can be formed. Lithium silicate is a colloidal solution.

The reaction to produce the reacted body is the same as that taught in the copending application; that is, the body can be treated between the freezing point and the boiling point of the solution and/or suspension for a sufficient length of time for reaction. The preferred temperatures are between 40° and 100° C. for times ranging between a few seconds, say 5 seconds, and 24 hours. These times will generally produce the reacted body which can then be fired to produce a glass body. Reaction or "curing" times for as long as 720 hours have been utilized but without any essential improvement in properties over those secured in the shorter periods.

We have found that certain precautions must be taken with firing the reacted body to produce a glass body. Since the reacted body still contains water and considerable amounts of volatile products from the organic compound and/or the organic ammonium silicate care must be taken in firing the body so as to avoid the cracking thereof. Thus, an idealized schedule would be one wherein the body would be slowly heated to remove the volatile constituents without cracking the body and then a higher temperature firing to fuse the body. Further, care must be taken to avoid, unless desired, crystallization of the body by firing at an excessively high temperature. The drying tempratures are sufficiently high and sufficiently long to expel any water, organic reaction products, and ammonia from the body without cracking the body. We have found that the optimum firing conditions for drying without cracking appear to comprise raising the temperature of the article slowly to about 450° C. and holding thereat for at least 2 hours. The body is then heated to a temperature whereat it will consolidate to a solid glass body. The firing temperature for consolidation of the body generally range between about 650° and 1400° C., depending upon the composition of the glass developed, for times commonly varying between about ¼–4 hours. Firing is usually carried out until a clear, translucent or opaque body of glass is produced. Where such firing results in an opaque or translucent body, this can indicate incomplete consolidation due to the presence of entrapped volatiles or the presence of devitrification. To insure the formation of a transparent article, it may be desirable in certain instances to dry and/or fire the reacted bodies in an evacuated chamber so as to facilitate the removal of the volatiles.

The volume of the fired glass body is significantly smaller than that of the original body formed through the reaction. We believe, however, that the fired volume is proportional to the concentration of non-volatile solids in the original solution. For example, if the non-volatile solids concentration was about 45% by volume, the final volume would be about 45% that of the original volume; or if the non-volatile solids concentration was 20% by volume, then the final volume would be 20% that of the original volume.

We have found that sodium silicate solutions are commonly effective in producing transparent glass bodies but tend to leave a black residue upon firing of the unleached body. More satisfactory than the sodium silicate solutions for yielding transparent glass articles are the potassium silicate solutions which normally do not leave this black residue. Probably the best transparent articles can be made from a mixture of quaternary ammonium silicate and potassium silicate solutions.

Two other important advantages of these solutions are that there is a decrease in the tendency of the body to crack during firing and an improvement in the durability of the glass brought about by introducing more silica into the body through the quaternary ammonium silicate solution. In order to obtain the most desirable bodies, we have found it necessary to keep the amount of organic used low so that some alkali will remain in the glass. This is advantageous since the alkali acts as a flux and aids in the consolidation of the reacted body to a glass.

The oxide composition of the final alkali metal-containing glasses can be determined from the oxide compositions of the starting solutions since it can be assumed tha there will be no loss of alkali metal oxide or silica from the beginning solution to the final body.

We have found a particularly easy technique to prepare these glasses is to use starting materials of commercially available soluble silicates and organic materials. The following table sets forth the composition in weight percent on the lithium silicate, potassium silicate, sodium silicate, and quaternary ammonium silicate solutions in addition to the formaldehyde and glyoxal solutions. The liquid formamide was utilized as received from the supplier as was paraformaldehyde which was purchased commercially as a particulate solid. The example as disclosed below utilized the solutions set forth in the table as well as the stock supplies of formamide and paraformaldehyde. Although those specific solutions were employed, it must be recognized that soluble silicate solutions of other compositions may be used. What must be met are the conditions set forth above with regard to the properties of the solution to be reacted.

TABLE

Lithium Silicate — 2.1% $Li_2O$, 20% $SiO_2$, balance water

Sodium Silicate — 6.7% $Na_2O$, 25.3% $SiO_2$, balance water

Potassium Silicate—8.3% $K_2O$, 20.8% $SiO_2$, balance water

Quaternary ammonium silicate — 9.85% quaternary ammonium ion, 45% $SiO_2$, balance water Formaldehyde — 37% formaldehyde, balance water Glyoxal — 30% glyoxal, balance water In the following examples, the ingredients were compounded and placed into a plastic beaker. The ingredients were mixed together for about 5–10 minutes utilizing a magnetic stirrer to achieve homogeneity. About 160 ml. of the mixture were then poured into an open NALGENE ™ plastic cylindrical container having a diameter of 1⅝ and a height of 3 ⅛. Each container was thereafter transferred to an electrically heated oven operating at about 85° C. and the ingredients allowed to react therein for about 16–20½ hours. After the curing, the formed bodies were removed from the NALGENE ™ Teflon ® containers a product of Nalge Co.., Rochester, N.Y., and consolidated to a glass body in accordance with the firing schedule recorded for each example.

In calculating the mole ratios below, Q represents the quaternary ammonium ion having a molecular weight of 164.

EXAMPLE I

The reaction mixture consisted of 300 ml. sodium silicate solution and 48 g. paraformaldehyde yielding a paraformaldehyde-to-$Na_2O$ mole ratio of about 3.72. After a 20½ hour reaction period, the formed body was hard, white, and opaque with no water remaining. The body was first air dried at room temperature for 144 hours within the NALGENE TM container. Thereafter, the body was removed from the container, placed in an electrically fired furnace, heated at 100° C. per hour to 450° C., held thereat for 2 hours, and then heated at 100° C./hour to 1000° C. and maintained thereat for two hours. The fired body was cooled to room temperature by merely cutting off the electric current to the furnace and allowing the furnace to cool with the body retained therein. This type of cooling has been termed cooling at furnace rate and averages about 2°–3° C./minute.

The glass body was black due to carbon which had not been completely burned out prior to the final consolidation firing.

EXAMPLE II

The reaction mixture comprised 150 ml. potassium silicate solution, 150 ml. sodium silicate solution, and 48 g. formaldehyde to result in a paraformaldehyde-to-$K_2O$ + $Na_2O$ mole ratio of about 4.2. After curing for 20½ hours, the formed body was hard, white, and opaque. Excess water was poured off and the body air dried at room temperature for 144 hours within the NALGENE TM container. Thereafter, the article was removed from the container, placed in an electrically fired furnace, heated at 100° C./hour to 450° C. held thereat for 2 hours, heated at 100° C./hour to 1000° C., maintained thereat for 2 hours, and then cooled to room temperature at furnace rate to produce a white opal product.

EXAMPLE III

The ingredients consisted of 270 ml. quaternary ammonium silicate solution, 30 ml. sodium silicate solution, and 48 g. paraformaldehyde to result in a paraformaldehyde-to-$Na_2O$ + $Q_2O$ mole ratio of about 10.5. After a reaction period of 20½ hours, the formed body was hard, translucent, and exhibited some crazing with no water remaining. The article was air dried at room temperature for 168 hours within the NALGENE TM container. Then, the body was removed from the container, transferred to an electrically heated furnace, heated to 100° C./hour to 450° C., held thereat for 2 hours, heated at 100° C./hour to 1400° C., maintained thereat for 2 hours, and thereafter cooled to room temperature at furnace rate to form an opal glass which was somewhat cracked.

EXAMPLE IV

The mixture to be reacted consisted of 100 ml. sodium silicate solution, 100 ml. potassium silicate solution, 100 ml. quaternary ammonium silicate solution, and 48 g. paraformaldehyde yielding a paraformaldehyde-to-$Q_2O$ + $Na_2O$ + $K_2O$ mole ratio of about 5.46. After curing this for 20½ hours, the formed cylinder was hard, white, and opaque with no excess water. The so-formed cylinder was air dried at room temperature for 96 hours within the container. Afterwards, the article was removed from the container, placed in an electrically fired furnace, heated at 100° C./hour to 450° C., maintained thereat for 2 hours, heated at 100° C./hour to 1000° C., held thereat for 2 hours, and then cooled to room temperature at furnace rate. The article was an opal glass.

EXAMPLE V

The reaction mixture comprised 270 ml. sodium silicate solution, 15 ml. potassium silicate solution, 15 ml. quaternary ammonium silicate solution, and 48 g. paraformaldehyde resulting in a paraformaldehyde-to-$Na_2O$ + $K_2O$ + QO mole ratio of about 3.93. The bodies resulting from the reaction of 20½ hours were hard, white, and opaque with no excess water. After air drying the body within the NALGENE TM container at room temperature for 144 hours, the cylinder was removed from the container transferred to an electrically fired furnace, heated at 100° C. per hour to 450° C., held thereat for 2 hours, heated at 1000° C. per hour to 1400° C., maintained thereat for 2 hours, then subsequently cooled to room temperature at furnace rate, yielding an opaque glass article.

EXAMPLE VI

A mixture of 300 ml. lithium silicate and 30 ml. formamide, comprising a formamide-to-$Li_2O$ mole ratio of about 2.72, was permitted to react for 20 ½ hours to yield a translucent body which was highly cracked but with no excess water. The article was removed from the NALGENE TM container and air dried at room temperature for 168 hours. Thereafter, the body was placed in an electrically fired furnace, heated at 100° C./hour to 450° C., held thereat for 2 hours, heated at 100° C./hour to 1400° C. maintained thereat for 2 hours, and, finally, cooled to room temperature at furnace rate to produce an opaque, glassy product.

EXAMPLE VII

The reaction mixture consisted of 270 ml. lithium silicate, 30 ml. potassium silicate, and 48 g. paraformaldehyde, yielding a paraformaldehyde:$Li_2O$ + $K_2O$ mole ratio of about 6.44. After reacting for 20½ hours, the thus-formed body was hard, translucent, with considerable surface crazing. The article was removed from the container and air dried at room temperature for 168 hours. Subsequently, the article was transferred to an electrically fired furnace, heated at 100° C./hour to 450° C., maintained thereat for 2 hours, heated at 100° C./hour to 1400° C., held thereat for 2 hours, and, thereafter, cooled to room temperature at furnace rate. The glass cylinders were opaque with some cracking.

EXAMPLE VIII

A reaction mixture of 100 m. lithium silicate, 100 ml. potassium silicate, 100 ml. quaternary ammonium silicate, and 48 g. paraformaldehyde was compounded to produce a paraformaldehyde-to-$Li_2O$ + $K_2O$ + $Q_2O$ mole ratio of about 6.9. After curing for 18 hours, a hard, semi-opaque body was produced which, after removal from the NALGENE TM container was air dried at room temperature for 120 hours. Then, the article was transferred to an electrically fired furnace, heated at 50° C./hour to 450° C., maintained thereat for 2 hours, heated at 100° C./hour to 650° C., held thereat for 2 hours, and, finally, cooled to room temperature at furnace rate. The fired cylinders were primarily transparent with some opaque areas.

EXAMPLE IX

The reaction mixture consisted of 270 ml. of lithium silicate, 15 ml. potassium silicate, 15 ml. quaternary ammonium silicate, and 48 g paraformaldehyde resulting in a paraformaldehyde-to-$Li_2O$ + $K_2O$ + $Q_2O$ mole ratio of about 6.5. After a reaction period of 18 hours, a hard, translucent body was formed which was removed from the container and air dried at room temperature for 168 hours. Thereafter, the body was placed in an electrically fired furnace, heated at 100° C./hour to 450° C., held thereat for 2 hours, heated at 10° C./hour to 1400° C., maintained thereat for 2 hours, and, then, cooled to room temperature at furnace rate to result in an opaque product.

EXAMPLE X

A mixture of 15 ml. lithium silicate, 270 ml. potassium silicate, 15 ml. quaternary ammonium silicate, and 48 g. paraformaldehyde yielding a paraformaldehyde-to-$Li_2O + K_2O + Q_2O$ mole ratio of about 5.1 was cured for 18 hours to produce a hard, white, opaque body. The container with the article retained within was transferred to an electrically fired oven operating at 85° C. and maintained thereat for 96 hours. The article was then removed from the NALGENE TM container, placed in an electrically fired furnace, heated at 50° C./hour to 450° C. maintained thereat for 2 hours, heated at 100° C./hour to 650° C., held thereat for 2 hours and, finally, cooled to room temperature at furnace rate. The fired cylinder was an opaque glass.

EXAMPLE XI

A reaction mixture of 100 ml. potassium silicate and 32 g. paraformaldehyde, comprising a paraformaldehyde-to-$K_2O$ mole ratio of about 9.7, was compounded and cured for 16 hours to form a hard, opaque body. After removal from the NALGENE TM container, the body was air dried for 216 hours at room temperature. Subsequently, the article was transferred to an electrically fired furnace, heated at 400° C./hour to 750° C., held thereat for 1 hour, and then cooled to room temperature at 400° C./hour to yield an opaque glass cylinder.

EXAMPLE XII

The reaction mixture comprised 100 ml. potassium silicate and 16 g. paraformaldehyde producing a paraformaldehyde:$K_2O$ mole ratio of about 4.8. After curing for 16 hours to a hard, opaque body, the body was removed from the container and air dried at room temperature for 216 hours. Thereafter, the article was placed in an electrically fired furnace, heated at 400° C./hour to 750° C., maintained thereat for 1 hour, and then cooled at 400° C./hour to room temperature. The fired product was opaque.

EXAMPLE XIII

A reaction mixture was prepared composed of 200 ml. potassium silicate solution and 50 ml. formaldehyde solution resulting in a formaldehyde-to-$K_2O$ mole ratio of about 2.8. The mixture was allowed to react for 20 ½ hours to produce a hard, white, opaque article with excess water. The article was air dried at room temperature for 72 hours within the NALGENE TM container. Subsequently, the body was removed from the container, transferred to an electrically fired furnace, heated at 100° C./hour to 450° C., held thereat for 2 hours, heated at 100° C./hour to 750° C., and maintained at that temperature for 30 minutes. At that temperature, a foamed body resulted having some glassy areas present. Thereafter, the body was heated at 100° C./hour to 1000° C., held thereat for 15 minutes, and then cooled to room temperature at furnace rate. The final product was glassy with areas of transparency and areas of opacity.

EXAMPLE XIV

A solution containing a $SiO_2$ concentration of about 1/7 moles/liter of solution was prepared by adding 150 cc. water to 100 cc. potassium silicate solution. Thereafter, 16 grams of particulate paraformaldehyde were slowly added to the solution, yielding a paraformaldehyde-to-$K_2O$ mole ratio of about 12.1. The mixture was cured for 144 hours to a hard, white, opaque article with considerable excess water. The article was air dried at room temperature for 72 hours within the container. Thereafter, the article was removed from the container, placed in an electrically fired furnace, heated at 100° C./hour to 450° C., held thereat for 2 hours, heated at 100° C./hour to 1000° C., held thereat for 4 hours, and thereafter cooled to room temperature at furnace rate.

The fired article was glassy, essentially completely opaque, with some surface cracking.

EXAMPLE XV

A reaction mixture was prepared composed of 200 ml. potassium silicate solution and 50 ml. glyoxal solution yielding a glyoxal-to-$K_2O$ mole ratio of about 2.7. The mixture gelled almost immediately to a brown, opaque body. After air drying for 144 hours at room temperature within the NALGENE TM container, the body was removed therefrom and heated at about 100° C./hour to 750° C. and held thereat for 30 minutes.

The fired article was glassy, brownish opaque, with some surface cracking.

We claim:

1. A method for making solid silicate glass articles comprising the steps of:
   (a) preparing true solutions and/or colloidal solutions and/or suspensions having a pH between about 10–15 and containing about 1–12 moles of $SiO_2$/liter in solution from soluble silicate solutions selected from the group consisting of an organic ammonium silicate, alkali metal silictes, and mixtures thereof;
   (b) reacting an organic compound therewith selected from the group consisting of formaldehyde, paraformaldehyde, and mixtures thereof at a temperature between the freezing point and the boiling point of the solution for a sufficient length of time to reduce the pH to between about 7–10 and polymerize the $SiO_2$, and
   (c) firing the polymerized $SiO_2$ body at a temperature between about 650°–1400° C. for a sufficient length of time to consolidate to a solid silicate glass body.

2. A method according to claim 1 wherein said true solutions and/or colloidal solutions and/or suspensions contain about 3–12 moles of $SiO_2$/liter in solution.

3. A method according to claim 1 wherein said organic ammonium silicate is a quaternary ammonium silicate.

4. A method according to claim 1 wherein said alkali metal silicates are selected from the group consisting of lithium silicate, sodium silicate, potassium silicate, and mixtures thereof.

5. A method according to claim 1 wherein the mole ratio of an organic compound selected from the group consisting of formaldehyde, paraformaldehyde, and mixtures thereof-to-alkali metal oxide and/or ammonium ion is about 2–13.

6. A method according to claim 1 wherein the reaction temperature is about 40°–100° C.

7. A method according to claim 1 wherein the time sufficient to reduce the pH below 10, polymerize the SiO$_2$ ranges about 5 seconds to 24 hours.

8. A method according to claim 1 wherein the time sufficient to consolidate to a solid silicate glass body varies between about ¼–4 hours.

9. A solid silicate glass body produced in accordance with claim 1.

* * * * *

UNITED STATES PATENT OFFICE
CERTIFICATE OF CORRECTION

PATENT NO. : 4,083,728
DATED : April 11, 1978
INVENTOR(S) : Francis L. Orso and Timothy E. Pierce It is certified that error appears in the above-identified patent and that said Letters Patent are hereby corrected as shown below:

Column 2, line 5, "waterleachable" should be -- water-leachable --.

Column 2, line 8, "opencelled," should be -- open-celled, --.

Column 2, line 10, "where" should be -- there --.

Column 2, line 28, "shape" should be -- point --.

Column 3, line 36, "temperature" should be -- temperatures --.

Column 6, line 7, "QO" should be -- $Q_2O$ --.

Column 6, line 49, "100 m." should be -- 100 ml. --.

Signed and Sealed this

Nineteenth Day of December 1978

[SEAL]

Attest:

RUTH C. MASON
Attesting Officer

DONALD W. BANNER
Commissioner of Patents and Trademarks